United States Patent [19]

Scheller et al.

[11] Patent Number: 4,848,564

[45] Date of Patent: Jul. 18, 1989

[54] SYNTHETIC RUBBER BALE WRAP

[75] Inventors: Andor Scheller, Baytown, Tex.; Gerald A. Le Grange; Norman E. Luker, both of Baton Rouge, La.

[73] Assignee: Exxon Chemical Patents Inc., Linden, N.J.

[21] Appl. No.: 203,790

[22] Filed: Jun. 7, 1988

[51] Int. Cl.$^4$ ............................................. B65D 71/00
[52] U.S. Cl. ................................... 206/83.5; 428/76; 428/156; 206/524.3
[58] Field of Search .......................... 428/68, 156, 76; 206/83.5, 524.1, 524.3

[56] References Cited

U.S. PATENT DOCUMENTS 2,885,074  5/1959  Lewis et al. ...................... 206/524.3
4,376,147  3/1983  Byrne et al. ......................... 428/156
4,436,520  3/1984  Lipko et al. ......................... 428/156

Primary Examiner—Alexander S. Thomas
Attorney, Agent, or Firm—J. F. Hunt; M. E. Wilson

[57] ABSTRACT

A film for use as a rubber bale wrap includes a thermoplastic containing a release agent and having a micro-embossed surface to provide the film with a gloss of 10 or less.

24 Claims, No Drawings

SYNTHETIC RUBBER BALE WRAP

BACKGROUND OF THE INVENTION

This invention relates to a film for rubber bales. In one aspect, it relates to a method for transporting rubber in bulk form. In another aspect it relates to rubber bales covered with a microembossed film. (The term "rubber" means synthetic rubber as defined in ASTM D-1566.)

In the manufacture of synthetic rubber such as butyl rubber, chlorobutyl, EPDM, EPR, etc., raw rubber pieces (referred to as "crumbs") are passed from the reactor though a drying oven, and collected in a compression mold where they are compressed into bales of dimensions generally in the range of 14"×28"×8". The bales are then placed in large containers ("bins") sized to receive from 30 to 45 of the bales for storage and transport. At the location of use (e.g. tire manufacturing plant), the bales are withdrawn from the bin and individually processed.

The bales are placed in the bin at elevated temperatures (120° F.–210° F.) which causes bale-to-bale sticking problems, particularly for the bales in the lower part of the bin. The sticking and cold flow of the rubber makes it difficult to remove individual bales from the bin. It is not economically feasible to permit the bales to cool to room temperature before placing them in the bins.

In years past, the bins included two corrugated dividers to provide the bins with three compartments for receiving three bale stacks. The individual bales were coated with talc or other particulate material in an effort to reduce bale-to-bale sticking. The coating process was not only not very successful, its application as a powder created health problems. This lead to the development of a thermoplastic film bale wrap. The bale wrap film is applied by conventional in-line equipment to completely encapsulate the rubber bale after the drying and molding steps but prior to being placed in the bin. The film thus prevents rubber-to-rubber contact and also resists cold flow of the rubber. The present bale wrap films include high pressure, low density homo polyethylene (LDPE) and ethylene vinyl acetate (EVA) copolymer.

Although the LDPE and EVA films were successful in preventing the sticking and the cold flow of the rubber bales, they presented downstream processing problems. Many end use applications can not tolerate the presence of ethylene homo or copolymer thermoplastics such as LDPE and EVE. The rubber bale for these applications must be stripped of the bale wrap film prior to compounding the rubber in mechanical mixers. Release agents such as synthetic waxes are generally added to the film resin to enhance the film pealability. However, existing films even with release agents are difficult to peal away from the rubber. Another problem associated with release agents is their effect on heat seal strength of the bale wrap film. When sufficient release agent is present to insure satisfactory release from the rubber bale, the seal strength suffers, particularly at higher temperatures (above about 250° F.) required to heat seal the film in the bale wrapping operation.

SUMMARY OF THE INVENTION

It has been discovered that by providing the bale wrap film with a certain surface profile balanced with a small amount of release agent in the film, the film exhibits its significantly improved release properties and good seal strength. The surface profile is characterized as microembossed to reduce the surface gloss to 10 or less, preferably between 3 to 8, as determined by ASTM D-2457. The microembossment may be achieved by passing cast film through a set of embossing rollers wherein the chill roll thereof is provided with (a) a micro pattern or (b) a random micro roughness to impart a fine matte finish to the film. The microembossed film may also be prepared by blown film with post embossing.

The bale wrap film may be prepared from any polyolefin presently used as rubber bale wraps (e.g. LDPE), but preferably is an ethylene copolymer, more preferably EVA with vinyl acetate (VA) contents of 1 to 12 wt %, and containing from 1 to 10 wt % of a release agent, preferably a synthetic wax. The preferred EVA contains from 4 to 9 wt % VA.

The invention thus contemplates the combination of (a) a synthetic rubber bale and (b) a film completely covering the bale and being composed of a thermoplastic polymer (preferably EVA) containing from 1 to 10 wt % of a release agent and having one of its surfaces microembossed to provide that surface with a gloss of 10 or less, preferably between 3 to 8. The term "gloss" as used herein is determined by ASTM D-2457-70 (Reapproved 1977) at 45°. In a preferred embodiment, the film surface in contact with the rubber bale is the microembossed surface.

The term microembossed includes the following
- (a) micro pattern embossed on a film surface and containing from 100 to 350 geometric repeating units per inch; and
- (b) a random (fine matte) finish giving the film a roughened surface which provides the film surface with an Ra (defined below) of 20 to 300 microinches, preferably 30 to 250 microinches.

The gloss of a film is a measure of the surface profile of a film. As stated in ASTM D-2457, gloss is a complex attribute of a surface which cannot be measured by a single number. Films of high gloss are smooth and therefore reflect more light. Films of low gloss on a micro scale diffuse or distribute light.

The invention also contemplates a method for wrapping a synthetic rubber bale with the film described above.

DESCRIPTION OF THE PREFERRED EMBODIMENTS

The film for use as a rubber bale wrap for purposes of the present invention should have the following properties:
good heat sealability and seal strength,
good antiblock properties,
good release characteristics, and
softness.

The microembossed surface of the bale wrap film improves the release properties, the seal properties and softness of the film. Tests indicate that the improved release properties and heat seal properties are due to both the microembossed surface and the film softness resulting therefrom. The release agent provides the film with adequate antiblock.

The microembossed surface provides the film with a surface gloss of 10 or less and preferably between 3 and 8 and may be provided with micro pattern or a matte finish. Each type of these embossed films are described below.

Micro Pattern

The micro pattern film, containing from 1 to 10 wt % of a release agent, is best prepared by cast extruding the film and passing it through counter rotating rollers, one of which is a chill roll having a geometric micro pattern formed on the surface thereof. For purposes of the present invention, micro pattern means a geometric pattern having from 100 to 350, preferably from 150 to 300, geometric repeating units per inch measured in the transverse direction (TD) and/or machine direction (MD) of the film. The most common pattern is a geometric pattern formed by intersecting embossed lines, the number of lines being from 100 to 350 per inch, preferably 150 to 300 per inch. By way of example, one such pattern is disclosed and described in U.S. Pat. No. 4,376,147, the disclosure of which is incorporated by reference herein. The intersecting lines may form square, rectangular or diamond patterns on the film surface. Cast extrusion of this type of film and embossing process are well within the skill of the art. The micro pattern on the surface of the film diffuses light thereby providing the film with a low gloss.

It should also be mentioned that the embossment can be achieved by preparing the film in conventional blown film processes and subsequently heating the film and processing it through counter rotating rollers to engrave the microembossing pattern on the film surface.

Matte Film

The matte film may be manufactured in a manner similar to the micropattern film except the chill roll has a random micro roughened surface such as that provided with a sandblasted chill roll. The surface of the chill roll should provide the film surface with a fine matte finish. The surface profile of the matte finish film may be characterized by its Ra and Rpm, which are defined as follows:

Ra—Height of roughness irregularities as measured by the average value of the departures from a center line drawn such that the sum of the areas above the line equals the sum of those below the line.

Rpm—Mean of the maximum profile height above the mean line of several passes.

Ra and RMS are terms recognized in the art as a surface roughness measurement and are approximately the same.

The preferred matte film has a gloss of 10 or less and more preferably between 3 and 8. The process for manufacturing matte film may be the same or similar as that described in U.S. Pat. No. 4,436,520, the disclosure of which is incorporated herein by reference. The preferred film is one wherein the surface profile, as measured by the Surtronics instrument (described below), has a mean value of maximum profile height (Rpm) less than 150, preferably less than 100 microinches.

The surface roughness of film may be measured by a number of instruments capable of precise surface measurements. One such instrument is Surtronics 3 manufactured by Rank Taylor Hobson.

As in the case of the microembossed pattern, the matte finish film may also De manufactured by first preparing the film by the blown method and subsequently processing the blown film through an embossing apparatus.

One of the film surfaces (preferably the inner surface) microembossed with a micropattern or fine matte finish, has a low gloss and hence exhibits the desired release properties to the bale wrap film. For example, microembossed film has a reduced secant modulus and improved softness in comparison to non embossed film. Moreover, the heat seal properties and release properties appear be improved by the microembossment.

As described in more detail below, the rubber bale is covered by a sheet of film and the edge portions thereof fuse welded together to completely enclose the bale. The heat seal temperatures, of course, depend on the polymer used. For EVA and LDPE film, the heat seal temperatures range from about 250° to about 400° F. The heat seal strength particularly in the TD are generally lower at the higher temperatures. The fused joints are usually the weakest part of the bale wrap. The strength of the heat sealed joints is further weakened by the presence of release agents. As described in more detail below, the microembossment of the film appears to improve the heat seal.

The preferred films are copolymers of ethylene with vinylacetate (EVA), methacrylate (EMA), ethylene acrylate (EEA), and methyl methacrylate (EMMA). EVA having a VA content between 1 to 12 wt %, preferably 4 to 9 wt %, provides excellent properties in terms of softness, heat sealability and elasticity. These properties coupled with the microsurface profile described above results in an excellent rubber bale wrap.

The polymers preferably have a MI of between 0.1 to 10, more preferably between 3 to 6.

The thickness of the bale wrap film is generally less than 10 mils, preferably between 0.5 to 8 mils, and more preferably between 3 to 6 mils.

Release Agent

The release agents useable with polymer films are frequently referred to as mold release agents. The preferred release agents for the present invention are the bisamide waxes. These synthetic waxes are available in a wide range of melting points. The release agents are dissolved or dispersed in the film resin and during extrusion or casting migrate to the surface, enhancing the releasability of the film from the rubber bales. The release agents also improve the bale sticking problem. The preferred release agents are bis-stearoylamide, bis-oleoylamide, and bis-ethylene distearamide. The preferred amide is bis-ethylene distearamide.

The concentration of the release agent may range from 1 to 10 wt % based on the combined weight of the release agent and the film resin, with 3 to 7 wt % being preferred.

The bale wrapping process of the present invention may be carried out using commercial rubber bale wrap equipment such as that sold by J&J.

In operations, the rubber bale upon being discharged from the compressor mold is moved by a conveyor to the wrapping apparatus. The wrapping film (containing an appropriate amount of release agent) is fed by two supply rolls disposed across the path of the bale. Movement of the bale into the film sheet causes the film to cover the front, top, bottom and rear, where the film is heat sealed and cut from the film supply rolls. The film on the two sides of the bale is then heat sealed, completely enclosing the bale.

One surface (preferably the inner surface) of the bale wrap film is microembossed as described above. Film-wrapped bales are collected in bins and transported to the fabrication plant, where the film is stripped away from each bale prior to compounding.

In a preferred embodiment the process for wrapping a rubber bale with a removable film in accordance with the present invention comprises: (a) wrapping a rubber bale with a thermoplastic film containing from 1 to 10 wt % of a release agent and having an embossed surface (gloss of 10 or less); (b) heat sealing the edges of the film to completely enclose the bale; (c) transporting or storing the bale in contact with other film wrapped rubber bales. The film wrapping process is carried out with rubber bale having temperatures between 120° F. and 210° F., depending on various production parameters.

As mentioned above the preferred thermoplastic for the film is an ethylene copolymer. The ethylene copolymers include those of ethylene and alpha-olefins having 3 to 16 carbon atoms such as propylene or 1-butene(e.g. LLDPE). Also included are copolymers of ethylene with unsaturated esters of a lower carboxylic acid or with an unsaturated carboxylic acid. The ethylene copolymers to be employed generally contain from 50 to 99 weight percent ethylene, most preferably from 60 to 95 weight percent ethylene, with the balance being one of the comonomers mentioned above.

EXPERIMENTS

Experiments were run on microembossed film samples to determine their release properties and heat seal properties.

The film samples were as follows:
Sample A: Cast microembossed LDPE homopolymer with 5 wt % of bis-ethylene distearamide (release agent); fractional MI.
Sample B: Blown LDPE homopolymer (nonembossed) with 5 wt % of bis-ethylene distearamide (release agent); fractional MI; 0.922 density.
Sample C: Cast microembossed EVA (6% VA) with 5 wt % of bis-ethylene distearamide (release agent); fractional MI.

The test samples were prepared as follows:
1. Slabs of rubber (chlorobutyl) were cut out of a rubber bale. The slabs were about 14" long and 7" wide.
2. A bale wrap film (Samples A,B, or C) was placed on each rubber slab and maintained thereon by a plate (about 0.14 psi compression force)
3. The slabs with the film secured thereto were placed in an oven for 48 hours (oven temperature of 95° C.).
4. The slabs and film were removed from the oven and permitted to cool to room temperature.
5. The peel strength properties of each sample were determined by the method described below.

The peel strength is a measure of the force (lb/inch of film width) required to pull the film from the rubber slab. The peel strength test involves placing the rubber slab with the film on the top surface thereon an inclined platform (incline angle of 20° with horizontal) and applying a horizontal pulling force to the top of the film to pull the film away from the rubber slab. (The direction of force forms a 20° angle with the film.) Once the the film initially releases from the rubber surface, it generally continues at about the same force. The force is recorded as lb/inch of film width. This test is a proposed ASTM test for measuring peel strength and is frequently referred to as 160° Peel Test. (The 160° angle is the angle the film peeled away from the rubber slab forms with the top surface of the slab.

The peel strengths of the film samples were determined with both the smooth side and the embossed side in contact with the rubber. Table I presents the properties of the Samples and the peel strength data.

TABLE I

| PHYSICAL PROPERTY | SAMPLE A | SAMPLE B | SAMPLE C |
|---|---|---|---|
| Film Finish | matte | smooth | matte |
| Embossed caliper (mil) | 4.14 | — | 4.38 |
| Average gauge (yield)(mil) | 4.03 | 4.13 | 4.12 |
| Ra (microinches) | about 100 | — | about 100 |
| Gloss (45°) embossed | about 5 | — | about 5 |
| smooth | about 37 | about 41 | about 28 |
| Secant modulus MD (psi) | 26500 | 32900 | 21600 |
| TD (psi) | 26800 | 36400 | 23700 |
| Rubber release (48 hrs. @ 95° C.) Smooth (lb/in width) | .31 | 2.1 | .13 |
| Matte (lb/in width) | .16 | — | .13 |

As reflected by the rubber release data in Table I, the microembossed film Samples (A and C) are much easier to peel away from the rubber the microembossed EVA copolymer film exhibits particularly good peel properties. It is also significant to note that the smooth side of the embossed film exhibits far superior release properties than the non embossed film.

The improved release properties for the embossed side are believed to be due to the microembossed surface in contact with the rubber and the softness of the film imparted by the embossment. The improved results for the smooth side of the embossed film are believed to be due to the softness. Thus, either side may be in contact with the rubber provided one side is embossed (gloss of 10 or less).

The effect of embossing on the film heat seal properties were determined in accordance with Test Method ASTM D-882. The energy input at failure was measured at various heat seal temperatures (above fusion temperature of the film polymer). These data are presented in Table II.

TABLE II

| | Energy (in-lb) MD | TD |
|---|---|---|
| Sample A | Homopolymer (Embossed) | |
| 275° F. | 12.4 | 18.4 |
| 300° F. | 7.9 | 4.1 |
| 350° F. | 4.1 | 1.1 |
| Sample B | Homopolymer Blown (Non-embossed) | |
| 275° F. | 3.6 | 3.2 |
| 300° F. | 2.7 | 2.0 |
| 350° F. | 0.8 | 0.6 |
| Sample C | Copolymer (Embossed) | |
| 275° F. | 15.9 | 29.3 |
| 300° F. | 13.0 | 20.2 |
| 350° F. | 9.0 | 20.3 |

The data of Table II reveals that substantially more energy was required to cause the seals of the embossed films (particularly the EVA film) to fail than those of the nonembossed film. Since energy is a combination of force and elongation, the more elastic films (i.e. those with lower secant modulus) require more energy to failure than the films with higher secant modulus (See Table I data for comparison of secant modulus).

Summarizing the data presented in Tables I and II, the microembossed film containing a small amount of release agent exhibited improved release properties and improved heat seal quality, and improved softness. The improved release and heat seal properties are believed to be due to the combination of micro surface profile, and the improved softness of the microembossed film.

What is claimed is:

1. A bale of rubber covered and in contact with a film to reduce blocking, the improvement wherein the film is a thermoplastic having one of its surfaces microembossed to provide said one surface with a gloss of 10 or less based on ASTM D-2457-70 at 45° and containing from 1 to 10 wt % of a release agent based on the combined weights of the film and the release agent.

2. The film covered rubber bale of claim 1 wherein the inner surface of the film in contact with the bale is embossed.

3. The film covered rubber bale of claim 2 wherein the inner surface of the film has a fine matte finish.

4. The film covered rubber bale of claim 3 wherein the inner surface of the film has an Ra of between 20 to 300 microinches.

5. The film covered rubber bale of claim 4 wherein the Ra is between 30 and 250 microinches.

6. The film covered rubber bale of claim 2 wherein the inner surface of the film is embossed with a micro pattern having 100 to 350 geometric repeating units per inch of the film surface.

7. The film covered rubber bale of claim 6 wherein the micro pattern is formed by two sets of intersecting embossed lines, said film having from 100 to 350 of said embossed lines per inch of film surface.

8. The film covered rubber bale of claim 7 wherein the film contains from 150 to 300 embossed lines per inch of film surface, said lines defining a rectangle, square, or diamond pattern.

9. The film covered rubber bale of claim 1 wherein the thermoplastic is a copolymer of ethylene and a comonomer selected from the group consisting of vinyl acetate, ethyl acrylate, methyl methacrylate, methacrylate, and alpha olefins having 3 to 16 carbon atoms.

10. The film covered rubber bale of claim 9 wherein the thermoplastic is EVA containing from 1 to 12 wt % of VA.

11. The film covered rubber bale of claim 10 wherein the EVA contains from 4 to 9 wt % of VA.

12. The film covered rubber bale of claim 1 wherein the inner surface of the film has a gloss of not more than 8 based on ASTM Test Method D-2457-70 at 45°.

13. The film covered rubber bale of claim 1 wherein the release agent is a bisamide wax and the concentration thereof is between 3 to 7 wt % based on the combined wt of the film and wax.

14. The film covered rubber bale of claim 13 wherein the release agent is selected from the group consisting of bisstearoylamide, bis-oleoylmide and bis-ethylene distearamide.

15. The film covered rubber bale of claim 1 wherein the film is a homopolymer polyethylene.

16. In combination
   (a) a bale of synthetic rubber.
   (b) a film completely enclosing said bale and being composed of ethylene vinyl acetate containing from 1 to 12 wt % of vinyl acetate, said film containing from 1 to 10 wt % of a synthetic wax release agent dispersed therein, said film having one of its surfaces microembossed to provide the film with a finish selected from the group consisting of a matte finish and a micropattern finish and having a gloss of 10 or less based on ASTM D-2457-70 at 45°.

17. The combination of claim 16 wherein the film is EVA containing from 4 to 9 wt % VA and said film having its inner surface microembossed to provide the inner surface with a gloss of between 3 and 8.

18. In a process of covering a bale of rubber with a removable film to reduce blocking, the improvement wherein the film is composed of a thermoplastic having from 1 to 10 wt % of a wax release agent dissolved or dispersed therein and has one of its surfaces microembossed to provide said surface with a gloss of 10 or less based on ASTM Test Method D-2457-70 at 45°.

19. The process of claim 18 wherein said surface is the inner film surface and is microembossed in a random configuration having a surface profile Ra of between 20 to 300 microinches.

20. The process of claim 18 wherein said surface is the inner film surface and has a micro pattern with 100 to 350 geometric repeating units per inch of film surface.

21. The process of claim 20 wherein the film is EVA containing 4 to 9 wt % VA.

22. The process of claim 18 wherein the film is composed of copolymer of from 88 to 99 wt % of ethylene and from 1 to 12 wt % of comonomer selected from the group consisting of vinyl acetate, ethyl acrylate, methacrylate, methyl methacrylate.

23. The process of claim 18 wherein the bale is wrapped at a bale temperature of between 150° F. and 210° F.

24. The process of claim 18 wherein the film thickness is between 3 and 6 mils.

* * * * *